United States Patent [19]

Shimomura

[11] Patent Number: 4,593,473

[45] Date of Patent: Jun. 10, 1986

[54] DIGITAL DISPLAY MEASURING APPARATUS

[75] Inventor: Toshitaka Shimomura, Kanagawa, Japan

[73] Assignee: Mitutoyo Mfg. Co., Ltd., Tokyo, Japan

[21] Appl. No.: 794,972

[22] PCT Filed: Mar. 8, 1984

[86] PCT No.: PCT/JP84/00092

§ 371 Date: Sep. 7, 1984

§ 102(e) Date: Sep. 7, 1984

[87] PCT Pub. No.: WO84/03559

PCT Pub. Date: Sep. 13, 1984

Related U.S. Application Data

[63] Continuation of Ser. No. 653,250, Sep. 7, 1984, abandoned.

[30] Foreign Application Priority Data

Mar. 9, 1983 [JP] Japan .................................. 58-38763
Mar. 17, 1983 [JP] Japan .................................. 58-45005
Mar. 31, 1983 [JP] Japan .................................. 58-56433

[51] Int. Cl.⁴ ............................................ G01B 7/28
[52] U.S. Cl. ................................. 33/169 R; 33/172 E; 33/551
[58] Field of Search ............ 33/172 E, 169 R, 143 L, 33/147 N, 551

[56] References Cited

U.S. PATENT DOCUMENTS

| 3,878,984 | 4/1975 | Sotiropoulos et al. | 33/172 E |
| 3,996,669 | 12/1976 | Anichini | 33/147 N |
| 4,244,108 | 1/1981 | Bailey et al. | 33/172 E |
| 4,289,382 | 9/1981 | Clark | 33/172 E |
| 4,505,042 | 3/1985 | Nishina | 33/172 E |

Primary Examiner—Willis Little
Attorney, Agent, or Firm—Koda and Androlia

[57] ABSTRACT

A digital display measuring apparatus including a probe which is movably installed to the body and is brought in contact with an object to be measured, an encoder which converts the displacing amount of the probe into electric signal pulse to output therefrom, a presetting device which establishes a measuring standard value in accordance with the object to be measured, a counter which counts the preset value and the electric signal pulses, and a digital display unit which displays in digital representation the measured value of the object with the basis of the counted value, wherein the presetting device comprises the preset switch which is operated at the time of establishing the preset value, and the preset memory in which an optional numerical value displayed on the digital display unit is established as the preset value by the operation of the preset switch, and displays in digital representation the measured value of the object on the digital display unit with the basis of this preset value.

5 Claims, 16 Drawing Figures

FIG. 11
(a) 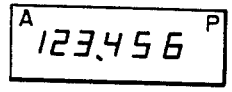
(b) 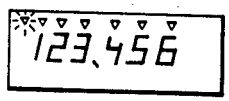
(c) 
(d) 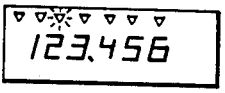
(e) 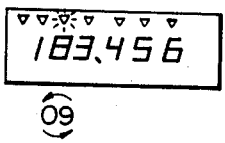
(f) 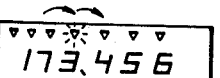
(g) 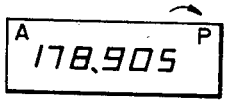
(h) 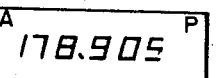
(i) 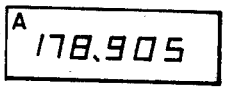

FIG. 12
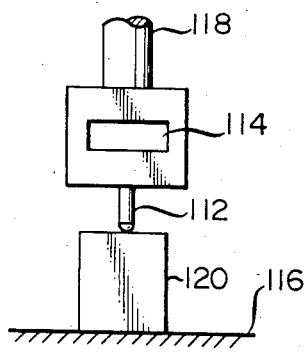
FIG. 14
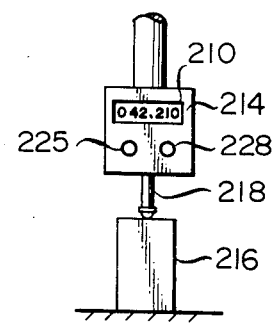
FIG. 15
(a)
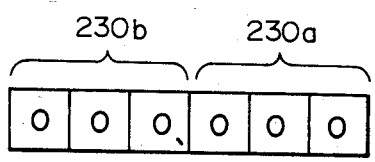
(b)
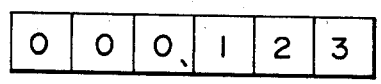
(c)
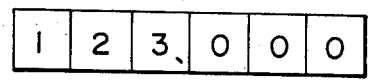
(d)
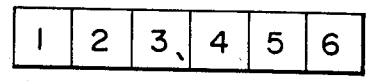

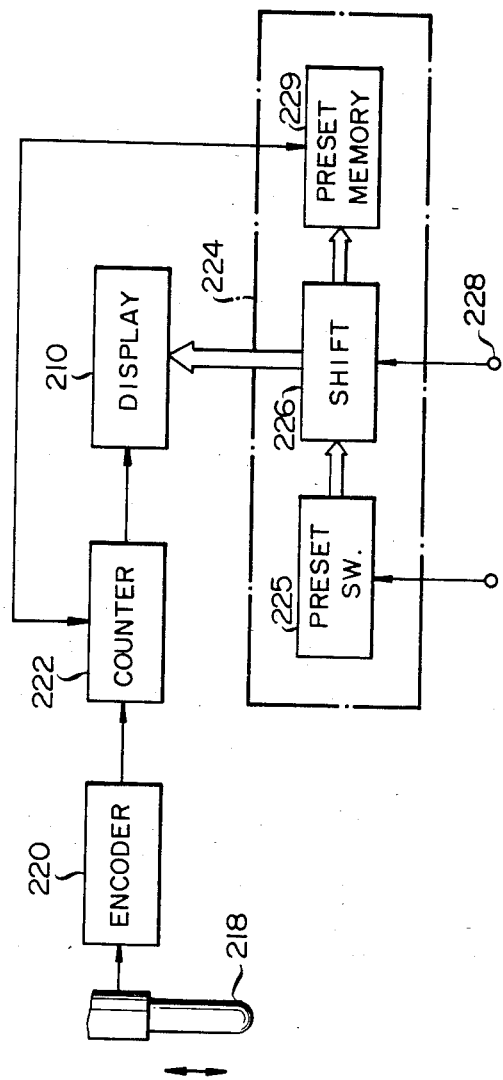

| 0 | 0 | 0 | 0 | 0 | 1 |

(b)

| 0 | 0 | 0 | 0 | 1 | 0 |

(c)

| 0 | 0 | 0 | 0 | 1 | 2 |

(d)

| 0 | 0 | 0 | 1 | 2 | 0 |

(e)

| 0 | 0 | 0 | 1 | 2 | 3 |

(f)

| 1 | 2 | 3 | 4 | 5 | 6 |

DIGITAL DISPLAY MEASURING APPARATUS

This is a continuation of application Ser. No. 653,250, filed Sept. 7, 1984, abandoned.

FIELD OF THE INVENTION

This invention relates to a digital display measuring apparatus, and, more particularly, to a digital display measuring apparatus which displays a measured value of an object to be measured in digital display with the basis of the preset value which is established in advance.

DESCRIPTION OF THE PRIOR ART

Such a measuring apparatus has been hitherto well-known that displays a measured value of an object to be measured in digital display. Since this digital display measuring apparatus enables the respective readers to delete the individual reading errors of the measured value and to read the concerned value in right away, it is of wide use among various kinds of manufacturing fields.

Generally, this kind of measuring apparatus includes a probe which is installed with the body of the apparatus to move freely and keeps in contact with the object to be measured, and an encoder which converts the moving amount of the probe into electric signal pulse being output therefrom. The electric signal pulse output from the encoder is counted at a counter and the counted value is displayed on a digital display unit.

The digital display as mentioned above enables a reader to read with extreme ease a displayed value shown on the display unit and to immediately obtain the measured value of the object to be measured.

However, the probe equipped with this kind of measuring apparatus is extremely limited its extent of moving stroke in relation to the measuring accuracy, and it is impossible to measure such an object that exceeds to the extent of moving stroke of the probe as it is.

Because of the above mentioned, generally, the digital display measuring apparatus using such kind of probe establishes in advance a measuring standard value in accordance with an object to be measured as a preset value and the absolute measurement or the comparative measurement is performed with the basis of the above mentioned preset value being set as the standard value.

In addition to the above, there are many cases that this kind of measuring apparatus has a judging function of allowance. In this case, the highest limit value or the lowest limit value must be preset in the apparatus.

In the measuring apparatus of the prior art, however, numbers of digital switches such as a selective switch of the numerical values from 0 through 9, a selective switch of the numerical figures selecting the figures to be displayed, etc., for example, are required in order to establish the preset value, and a switch board for these digital switches to be installed on must be made so larger that the apparatus is required to be designed larger.

Especially, since development of electronic technique has made the total sizes of the apparatus get smaller today, the switch board is required small-sized to fit for the small-sized apparatus and the effective accommodation has been requested.

In addition to the above, since the other kinds of switches are also installed on the switch board on which the digital switches are placed for the preset, requirement of many digital switch operation for the establishment of a preset value easily induces misoperation of these switches and further there causes such problem that the operational capability is much lowered.

SUMMARY OF THE INVENTION

Accordingly, it is an object of the present invention to obtain a digital display measuring apparatus in which the presetting device to be used for the establishment of a preset value is made in small size and its operation can be easily performed.

In keeping with the principles of the present invention, the object is accomplished with the digital display measuring apparatus including a probe which is movably equipped with the apparatus itself to keep in contact with an object to be measured, an encoder which converts the displacing amount of the probe into electric signal pulse to be output therefrom, a presetting device which establishes the measuring standard value as a preset value in accordance with the object to be measured, and a counter which counts the preset value and the electric signal pulse, and, in the digital display measuring apparatus which displays in digital display the measured value of the object with the basis of the counted value with the standard of the preset value, the above mentioned presetting device includes a preset switch which is operated when the preset value is established and a preset memory in which an optional numerical value displayed on the digital display unit is established as the preset value.

In the above mentioned composition, according to the present invention, the optional numerical value displayed on the digital display unit can be established as the preset value so that the numbers of the switches required for the establishment of the preset value are decreased to the minimum and the presetting device can be designed in small size to have better operational capability.

BRIEF DESCRIPTION OF IHE DRAWINGS

FIG. 11 is an illustration showing the displays of a display unit 14 in accordance with the flow charts shown in FIGS. 8 tnrough 10;

FIG. 12 is an illustration describing the operation of preset value establishment in accordance with the flow charts in FIGS. 8 through 10;

FIG. 13 is a block diagram showing the third preferred embodiment of the present invention;

FIG. 14 is a schematic outer view of the third embodiment of the present invention;

FIG. 15 (a) through (d) are schematic drawings illustative describing prefered presetting action showing an example that a display of the third embodiment is divided into predetermined several units and the whole of numerical value input in the lower disply unit is collectively shifted up to the higher disply unit at one time; and FIG. 16 (a) through (f) are schematic drawings illustative describing prefered presetting action showing an example that a display unit of the third embodiment is divided into the individual one digit and the numerical value input in the lower digit is shifted up to the higher digit upward one digit by one digit.

DETAILED DESCRIPTION OF THE EMBODIMENTS

The First Embodiments

Figure 1:
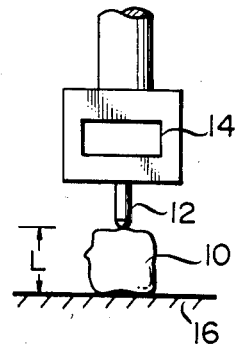
FIG. 1 is an outer view describing the first preferred embodiment of the present invention.

FIG. 1 is an outer viow showing a preferred embodiment of a digital display measuring apparatus which is applied the teachings of the present invention. The measuring apparatus of the present invention in this embodiment includes a probe 12 which is movably installed with the body of the apparatus, not illustrated, to be brought in contact with an object 10 to be measured and a digital display unit 14 which displays the measured value of the object 10 in digital representation so that the contact between the object 10 placed on a measuring table 16 and the top end of the probe 12 measures the dimensions of the object 10 to display the measured value on the digital display unit 14.

Figure 2:
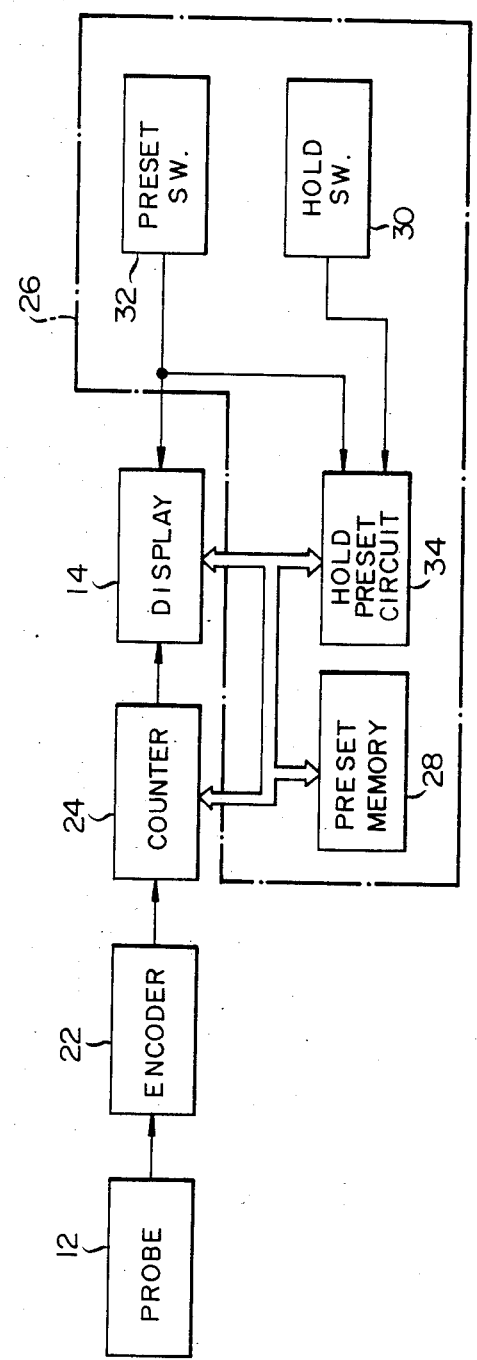
FIG. 2 is a block diagram showing the first embodiment.

FIG. 2 is a block diagram of an electric circuit showing the preferred embodiment in accordance with the measuring apparatus of the present invention.

The apparatus of this embodiment includes an encoder 22 which detects a displacing amount of the probe 12 by well-known means of an optical or magnetic detector, a variable resister, or the like, and outputs electric signal pulse in accordance with this detected displacing amount, and a counter 24 which counts the electric signal pulse output from the encoder so that the counted value of the counter is displayed in digital representation on the display unit 14 as the measured value of the object 10.

The apparatus of the present invention installs a presetting device 26 which sets a requested numerical value in advance. The measuring standard value for the absolute measurement or the comparative measurement and the highest limit value or the lowest limit value for the allowance judgement, for ecample, are established.

The present invention is characterized in that the preset value is established by the application of the counted value in the counter 24 which is displayed in the display unit 14 and the requested numerical value can be preset through less numbers of switches.

Prepared in the presetting device 26 of this embodiment are a preset memory 28 in which the predetermined numerical value is set in advance, a hold switch 30 and a preset switch 32 which are used for the preset operation.

The switch outputs from the hold switch 30 and the preset switch 32 are input to a preset hold switch 34, which holds and displays the counted value of the counter 24 on the display unit 14 by the touch operation of the hold switch 30. The touch operation of the preset switch 32 presets the held display value in the preset memory 28.

In the apparatus of this embodiment, the hold switch 30 can be used to simply hold and display the counted value of the counter 24 without any interferance with the presetting operation.

Figure 3:
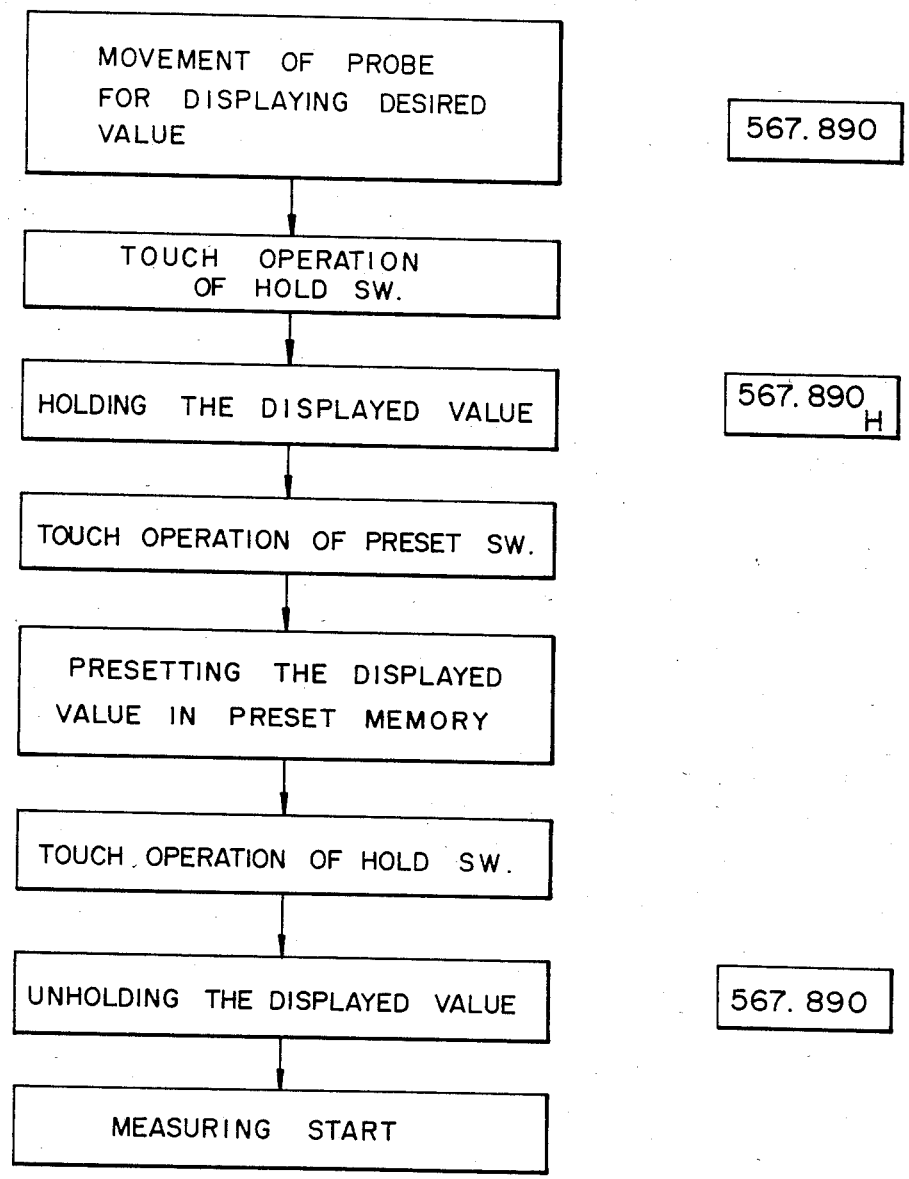
FIG. 3 is a flow chart describing the operation of the apparatus in accordance with the first embodiment.

FIG. 3 is a flow chart describing the operation of preset value establishment in accordance with the apparatus of this embodiment.

In the apparatus of the present invention, the movement of the probe changes the counted value of the counter 24 which is displayed on the display unit 14.

In order to preset a numerical value in the device of the present invention, the probe 12 is moved firstly to display on the display unit 14 the requested numerical value to be preset "567.890" in this embodiment for example.

After the requested numerical value, "567.890" for example, is displayed on the display unit 14, touch operation of the hold switch 30 activate the preset hold circuit 34 so that the preset hold circuit 34 can hold the displayed value on the display unit 14. Accordingly, the displayed value on the displayed unit 14 does not change if the probe 12 is moved afterwards as long as the hold is not released.

In this state, the next touch operation of the preset switch 32 continuously activates the preset hold circuit 34 to preset the numerical value holdingly displayed on the display unit 14, "567.890" for example, in the preset memory 28. This touch operation of the preset switch 32 is generaly performed in such state that a block gauge having the value corresponding to the numerical value holdingly displayed on the display unit 14 is placed on the measuring table 16 and the top end of the probe 12 is brought in contact with the surface of the block gauge.

After the requested numerical value is preset in the preset memory 28, another touch operation of the hold switch 30 releases the display held on the display unit 14 by the preset hold circuit 34 to start measuring action.

Accordingly, in the apparatus of the present invention a preset value displayed on the display unit 14 is registered and established in the preset memory 28 as the value representing the position of the top end of the probe 12. The preset value newly registered and established in such a way as mentioned above becomes the measuring standard value to start measuring the object 10.

As mentioned above, according to the apparatus of the present invention, since the simple combined operation of the hold switch 30 and the preset switch 32 can establish a preset value without any complicated switch operation required, the switch operation capability at the time of the preset value establishment increases so easily that the misoperation of the switches can be effectively prevented. Furthermore, according to the apparatus of the present invention, the switches to be used for the preset value establishement can be extremely reduced, and it becomes possible that the apparatus in total as well as the presetting device 26 are designed in small sizes.

Figure 4:
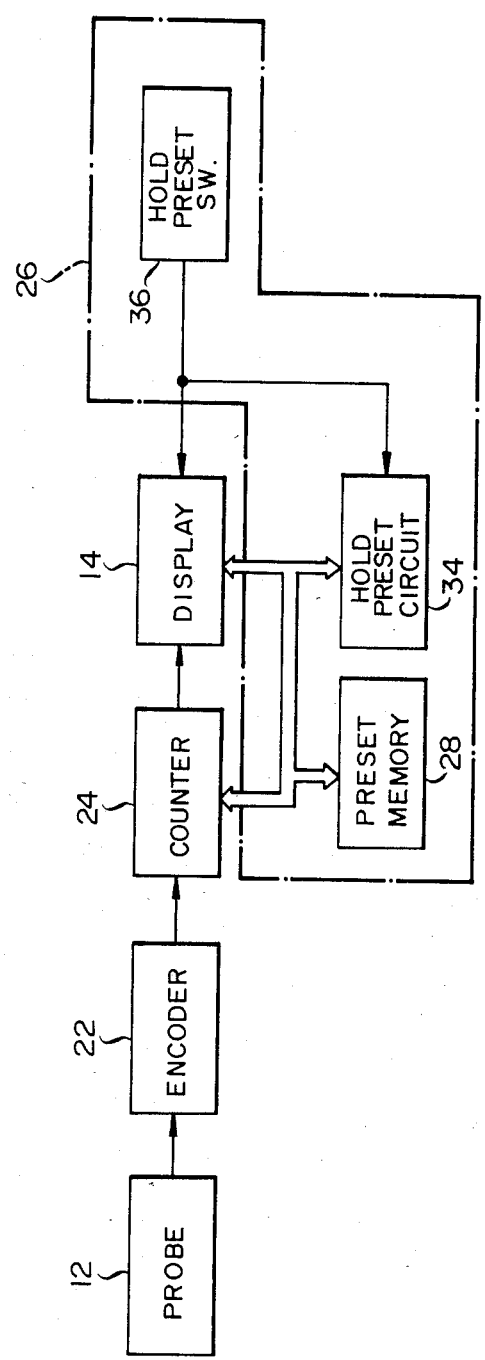
FIG. 4 is an illustration describing an improved example of the first embodiment.

FIG. 4 is an illustration describing an improved example of the preset device in accordance with the first embodiment. In this device of the embodiment, prepared therein is a hold-preset switch 36 which includes two functions of the hold switch 30 and the preset switch 32 which were described of in the above.

This hold-preset switch 36 works for the hold switch by the touch operation and for the preset switch by the continuous touch operation for a certain time (continuous touch operation for more than three seconds in this embodiment).

Figure 5:
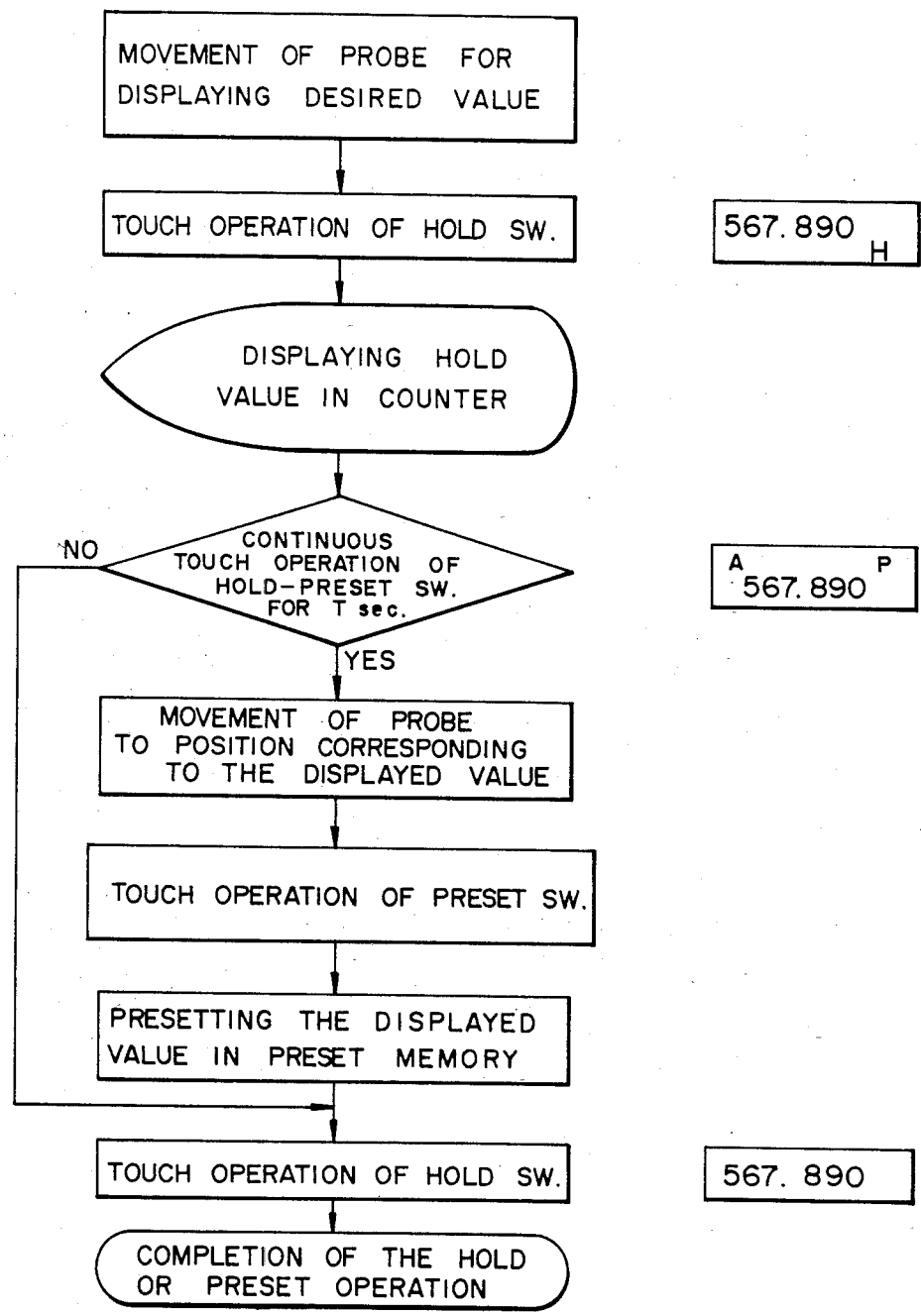
FIG. 5 is a flow chart of the apparatus illustrated in FIG. 4.

FIG. 5 is a flow chart showing the case that the measuring standard value for the absolute measurement or the comparative measurement is preset in the preset memory 28 by using the presetting device of this embodiment.

In order to preset such measuring standard value, the probe 12 is moved at first to display on the display unit 14 the numerical value corresponding to the measuring standard value, "567.890" for example, and the hold-preset switch 36 is activated by the touch operation at the state of such numerical value being displayed thereon. At this time the switch 36 works as the hold switch, and the counted value "567.890" in the counter is displayed on the display unit 14 together with the signal of hold "H".

When the apparatus is required to release such hold display, the continuous touch operation of the hold-preset switch 36 following after the first touch operation of the switch 36 releases the hold display on the display unit 14 and the measuring action can be started.

In order to preset in the preset memory 28 the numerical value holdingly displayed on the display unit 14 by the above mentioned hold and touch operation of the switch 36, performed is the continuous touch operation of the hold-preset switch 36 for a certain time, more than three seconds in this embodiment, following after the first touch operation of the switch 36. As mentioned above the continuous touch operation df the hold-preset switch 36 for a certain time has the switch 36 to work for the preset switch. The display unit 14 displays "A" representing that the measuring apparatus is switched into the absolute measuring mode, and "P" showing that the measuring apparatus is changed into the preset state instead of "H" representing the hold state, and the counted numerical value of the counter 24 is holdingly displayed on the display unit 14.

In this state, the position of the top end of the probe 12 is adjusted to correspond with the measuring standard value displayd on the display unit 14. After completion of the adustment of its position, the touch operation of the hold-preset switch 36 has the hold-preset circuit 34 to transmit the numerical value displayed on the display unit 14 toward the preset memory 28 so that the numerical value can be preset in the preset memory 28 as the measuring standard value.

After the completion of the preset operation as mentioned above, the touch operation of the hold-preset switch 36 resets the value holdingly displayed on the display unit, and the measuring apparatus can start the absolute measuremeht or the comperative measurement of the object 10 with the basis of the newly preset measuring standard value.

As mentioned above, in this embodiment, as only one switch can be used for the establishment of the requested preset value, the apparatus in total can be further designed smaller than the one described in the previous embodiment and the operational capability of the switch becomes more preferable.

In the embodiments described heretofore, the example is taken on the case of the establishment of one preset value in the preset memory 28, but it is also possible in the apparatus of the present invention that a plurality of the preset value is establised in the preset memory 28, not limited to one as mentioned above.

Furthermore, in the embodiments described heretofore, the example is taken on the case of the establishment of the numerical value within the region of the moving stroke of the probe 12 as the preset value, but it is also possible in the apparatus of the present invention that the value exceeding over the region of the moving stroke of the probe 12 is established as the preset value.

In this case the probe 12 is repeatedly moved forward and back and this moving amount is counted and added one by one in the counter 24 to be displayed on the display unit 14. Such operation makes it possible to establish the requested numerical value as the preset value, not limited to the moving stroke of the probe 12.

Additionally, in the apparatus of the present invention, there is a counter measure, installation of backup power supply or the like for example, figured for erase of the preset value registered and established in the preset memory 28 in case of no power supplied or the power switched off.

Furthermore, in the embodiments described heretofore, the example is taken on the case that the measuring standard value for the absolute measurement or the comperative measurement, the highest limit value and the lowest limit value for the allowance judgement, etc. are preset as the preset value, but it is possible in the apparatus of the present invention that the other values, the time value if the apparatus has the timer function for example, are preset for the preset value.

As described heretofore, according to the apparatus of the present invention, since the establishment of the preset value can be performed by the simple switch operation and the extremely less numbers of switch, the apparatus in total can be simply designed in small sizes. Moreover, according to the apparatus of the present invention, since the operating switches can be reduced to the minimum at the time of the preset value establishment, the operational capability can be increased and the misoperation of the switches can be effectively prevented.

The Second Embodiment

Referring more particularly to the drawings, described in the following is the second preferred embodiment of the digital display measuring apparatus in accordance with the teacings of the present invention.

Figure 6:
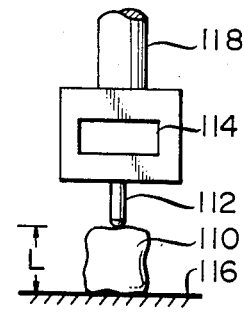
FIG. 6 is an outer view describing the second preferred embodiment of the present invention.
Figure 9:
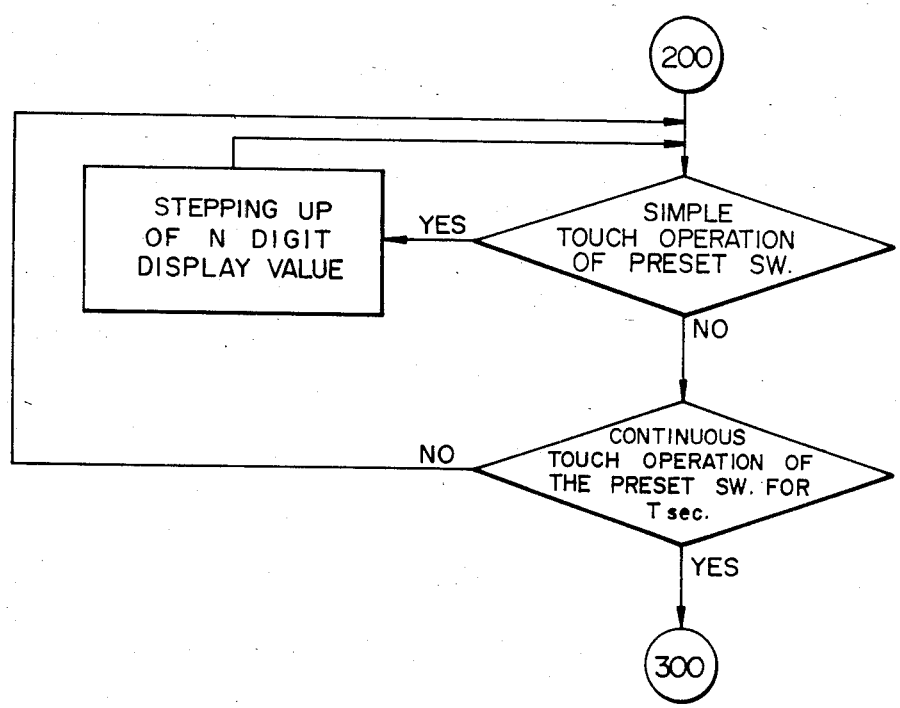
FIGS. 8 through 10 are flow charts describing the operation of the second embodiment.

In FIG. 6 shown therein is the second preferred embodiment of the digital display measuring apparatus of the present invention. The measuring apparatus of this embodiment includes the probe 112 which is movably installed wth the body of the apparatus, not illustrated, to be brought in contact with an object 110 to be measured and the digital display unit 114 which displays the measured value of the object 110 in digital representation so that detection of the contact position between the object 110 placed on the measuring table 116 and the top end of the probe 112 measures the dimensions of the object 110 to display the measured value on the digital display unit 114.

Accordingly, the digital display enables a reader to read with extreme ease the displayed value shown on the display unit and to immediately obtain the measured value of the object 110 to be measured.

However, since the moving stroke of the probe 112 is extremely limited its moving region as previously mentioned, this kind of measuring apparatus is equipped with a measuring arm 118 which freely slides on the apparatus itself, not illustrated, and the probe 112 is installed on the arm 118 to move freely along its axis direction.

Furthermore, the measuring arm 118 is slided and fixed at a certain required height to measure the sizes of the object to be measured and the position of the top end of the probe 112 installed on the measuring arm 118 is preset in advance as the measuring standard value so that the dimensions of the object 110 can be measured in the absolute measurement and the comparative measurement by the displaced amount of the probe 112 with the basis of the preset value.

Figure 7:
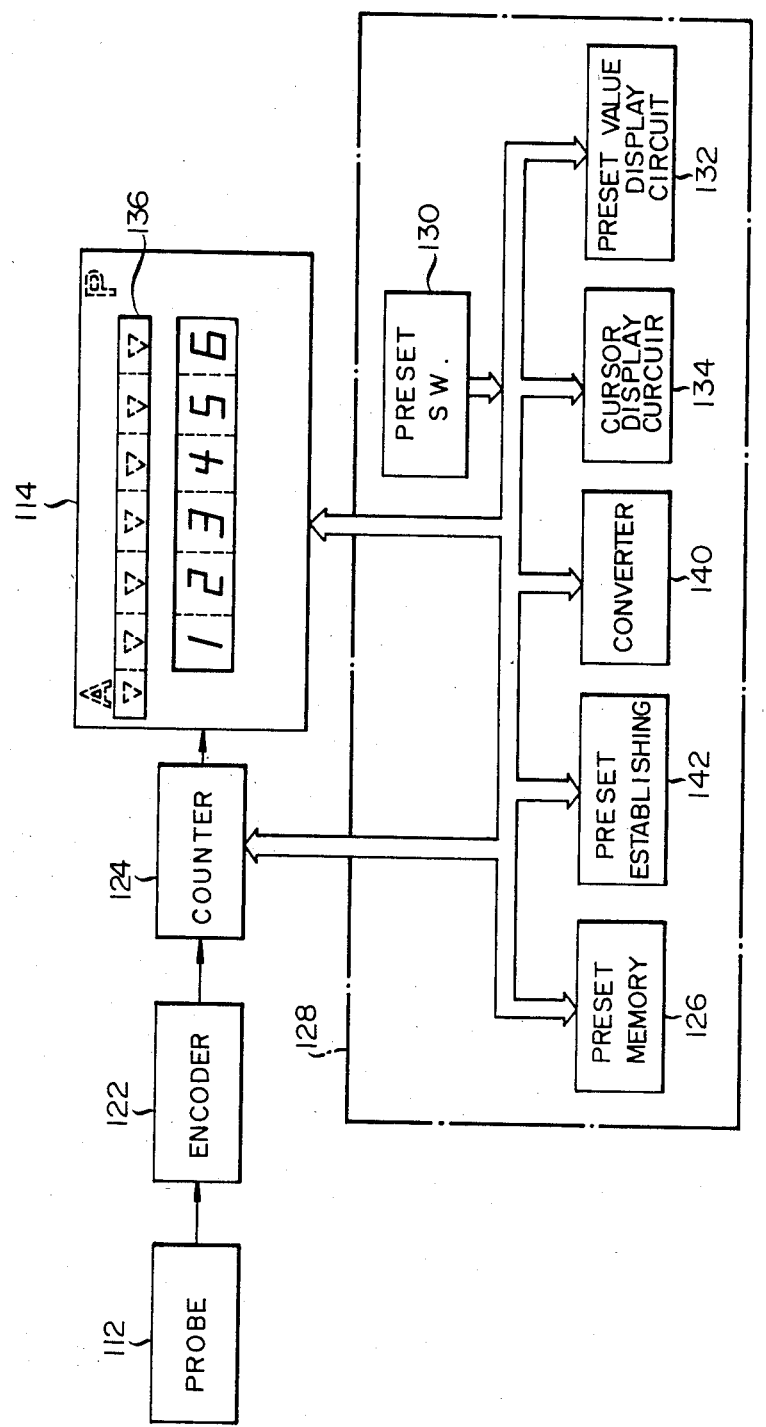
FIG. 7 is a block diagram showing the second embodiment.

In FIG. 7 shown therein is a block diagram of the second preferred embodiment of the apparatus in the present invention.

The apparatus of this embodiment includes an encoder 122 which detects the displacing amount of the probe 112 by well-known means of an optical or magnetic detector, a variable resister, or the like, and outputs electric signal pulse in accordance with this detected displacing amount, and a presetting device 128 in which the measuring standard value in accordance with the object 110 to be measured is established in advance in a preset memory 126 as the preset value so that the preset value and the electric signal pulse output from the encoder 122 are counted by the counter 124 and the measured value of the object 110 is displayed on the display unit 114 in digital display on the basis of this counted value.

The present invention is characterized in that the preset value can be established in compliance with the object 110 to be measured by a series of combined operations of a preset switch 130 in accordance with the predetermined time sequence and the numbers of preset switch to be used for the establishment of the preset value can be reduced so simply that the apparatus itself can be designed in small sizes and the operational capability of the switches can be more preferable.

Figure 8:
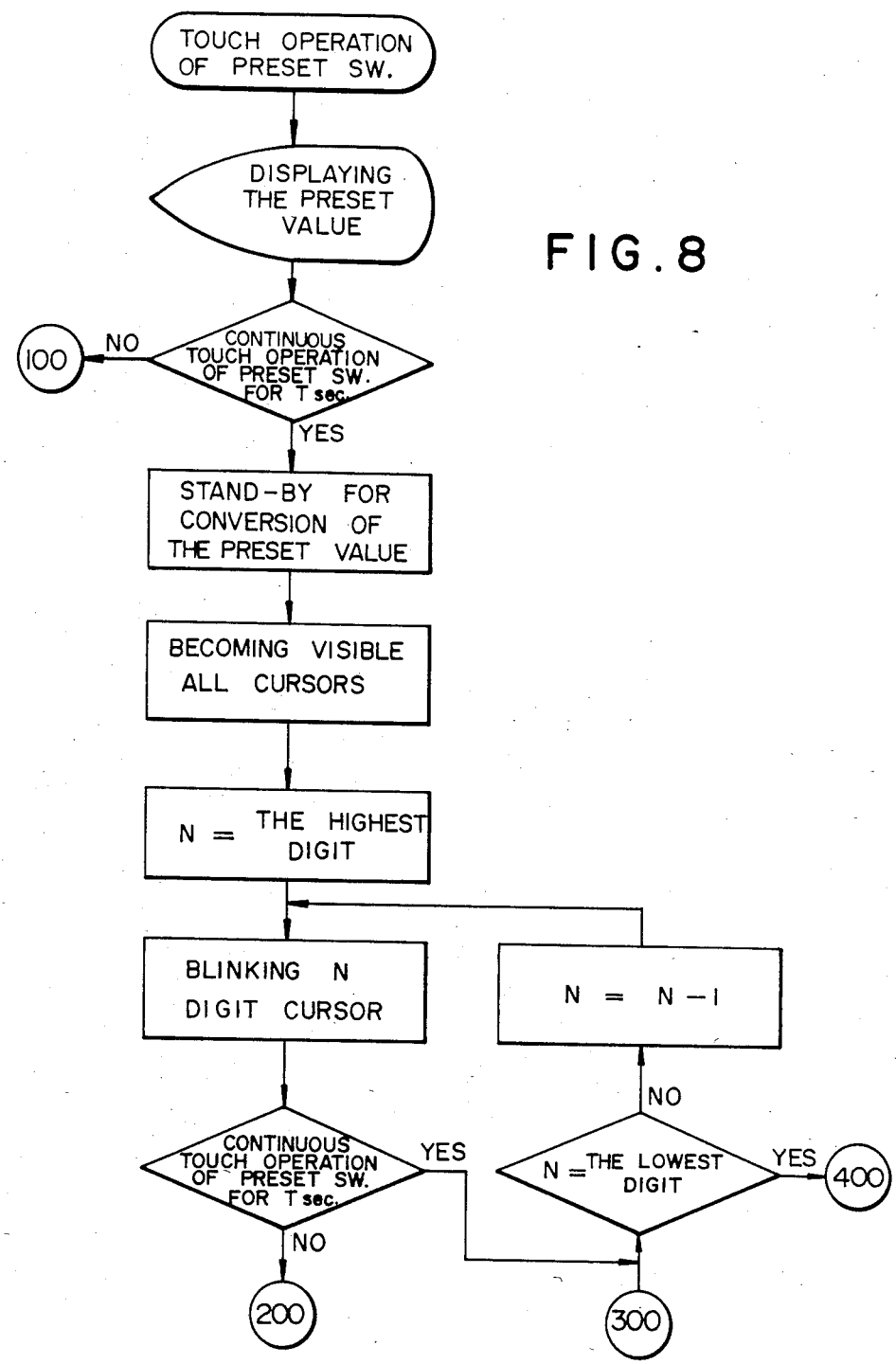
Figure 10:
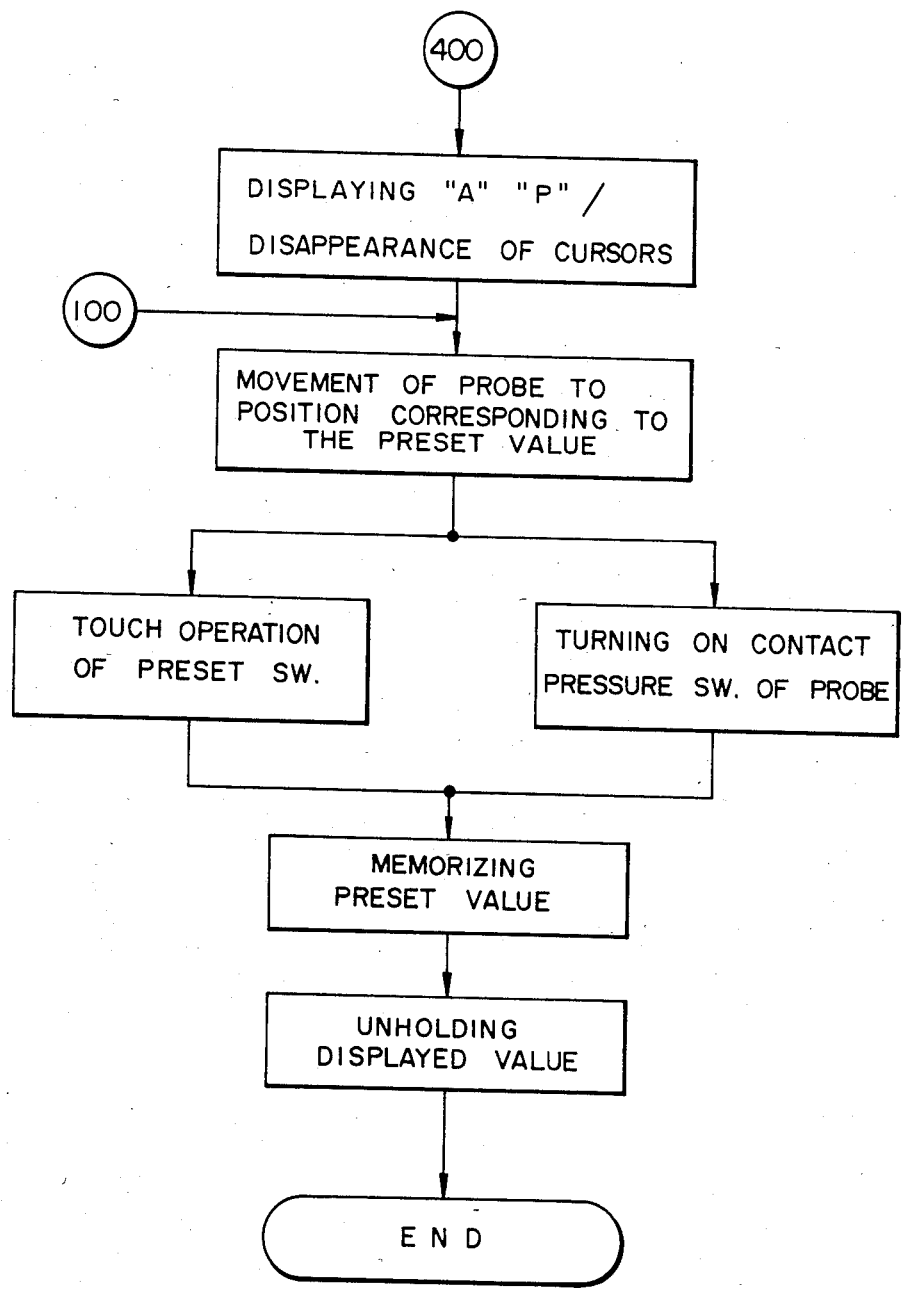

Accordingly, the apparatus of this embodiment is formed so that the requested preset value can be established by the combined operations of the preset switch 130 in accordance with the flow chart shown in FIG. 8 or FIG. 10.

The details of the presetting device 128, which is one of the characterized items in the present invention, is hereinafter described.

(1) Call of The Preset Value

In the device of the present invention, in order to call and display any numerical value on the display unit 114, prepared is a preset value display circuit 132 which displays the preset value on the display unit 114 by the call touch operation of the preset switch 130. The preset display circuit 132 in this embodiment is formed so that the simple touch operation of the preset switch 130 can call and display the preset value in the preset value in the preset memory 126 on the display unit 114.

Furthermore, at the same time when the preset value established in the preset memory 126 is called and displayed on tne display unit 114 by the touch operation of the preset switch 130 as shown in FIG. 11 (a) for example, the device automatically displays "A" representing the absolute measurement mode and "P" representing the preset action.

Incidentally, when the preset value is not established in the preset memory 126, the value of "0" is read out and displayed on each of the digits on the display unit !14.

As mentioned above, according to the device in this embodiment, the single touch operation of the preset switch 130 can call and display the preset value in the preset memory 126 on the display unit 114.

(2) Conversion of The Preset Value

In order to change the preset value called and displayed on the display unit 114 by the touch operation to call the preset value as is mentioned above into the other value, a cursor 136 is prepared at every display digit on the display unit 114 in the apparatus of the present invention.

Furthermore, in order to replace each of the display digits of the preset value displayed on the digital display unit 114 into the requested numerical value by means of using the cursor 136, installed in the presetting device 128 are a cursor display circuit 134 which moves one after another the cursor display digit by the moving cursor touch operation of the preset switch 130 after the certain time continuation and a converter 140 which advances and converts one after another the cursor display digit of the displayed preset value on the digital display unit 114 by the advance touch operation of the preset switch 130.

In such composition as is mentioned above, according to the present invention, the adequate combination of the moving cursor touch operation and the advance touch operation of the preset switch 130 can convert each of the digits of the preset value displayed on the digital display unit 114 into the other numerical value and display the requested numerical value as the new preset value on the digital display unit 114.

In this embodiment, in such state that the preset value is called and displayed on the display unit 114 as is shown in FIG. 11 (a), the cursor display circuit 134 displays a plenty of cursor 136 on the display unit 114 corresponding to each of the display digits by the continuous touch operation of the preset switch 130 for more than a predetermined time, the continuous touch operation for more than three seconds in this embodiment, as is shown in FIG. 11 (b), and blinks the cursor positioned at the left end in the displayed cursor 136. The displays of "A" and "P" are automatically erased at the same time of the display of the cursor 136.

The blinks of the cursor 136 represents that the value of the displayed digit corresponding to the blinking cursor is convertible into the other numerical value. Furthermore, this cursor display circuit 134 moves the blinking cursor one digit by one digit from the higher digit toward the lower digit at every three second elapse, as is shown in FIG. 11 (b) and (c), by means of the continuous moving cursor touch operation of the preset switch 130.

Accordingly, when the moving cursor touch operation of the preset switch 130 is discontinued on the way the cursor is blinking at the digit of ten, as is shown in FIG. 11 (d) for example, the blinking cursor stops its movement to stay at the digit of ten with blinking action continued.

In this state mentioned above the advance touch operation consisting of simple touch operation of the preset switch 130 activates the converter 140 to cyclically advance one after another the displayed value of the digit of ten among the numerical values from 0 through 9 whenever this advance touch operation is performed, as is shown in FIG. 11 (e), and the displayed value of the display digits can be converted into the requested numerical value.

After the completion of the advance touch operation, another moving cursor touch operation starts to move the blinking cursor further lower digit one after another.

Therefore, according to the apparatus of the present invention, each of the display digits of the preset value called and displayed on the display unit 114 can be converted one after another into the other numerical value by moving cursor touch operation and the advance touch operation of the preset switch 130, and the values displayed on the display unit 114 can be converted into the requested values and newly displayed on the display unit 114, as is shown in FIG. 11 (b) through (f).

Incidentally, in the apparatus of the embodiment, conversion of the numerical value in each of the digits is performed only on its digit and the other digits are not affected. In other words, in the apparatus of this embodiment, in case of advancing from 9 to 0 at the digit of ten for example, the counter measure is taken so that the carry up to the higher digit, that is, the digit of hundred, cannot interfere the displayed value thereon.

As mentioned above, in the apparatus of this embodiment, when the blinking cursor passes through the last digit after the completion in the conversion of all the numerical values on the required displayed digit by means of the combination of the moving cursor touch operation and the advance touch operation to the preset switch 130, the display cursor 136 is automatically discontinued from the display unit 114 and the signals "A" and "P" are again displayed to show the completion of a series of the preset value converting operation, as is shown in FIG. 11 (g).

When the value displayed on the display unit 114 is again changed into the other value, a series of the operation of the preset switch 130 is once more performed, as is mentioned above, after the preset switch is once released.

(3) Establishement of The Preset Value

After the completion of a series of the preset value converting operation, in order to establish the preset value after the conversion as the new preset value, a preset establishing circuit 142 is prepared in the apparatus of the present invention.

This preset value establishing circuit 142 establishes the preset value after the conversion as the new preset value in the preset memory 126 after the completion of a series of the preset value converting operation of the preset value displayed on the display unit 114, and a series of the preset value establishing operation is completed by the establishing touch operation of this preset switch 130.

This establishing touch operation of the preset value is generally performed at such state that the block gauge having the value corresponding to the new preset value displayed on the display unit 114 is placed on the measuring table 116 as is shown in FIG. 12 and the top end of the probe 112 is brought into contact with the surface of the block gauge 120.

At this time the preset value establishing circuit 142 establishes and registers in the preset memory 126 this preset value displayed on the display unit 114 as the value representing the position of the top end of the probe 112 at the time of the touch operation of the preset switch 130. The measuring apparatus measures the object 110 to be measured with the basis of the new preset value established and registered as is mentioned above as the new measuring standard value.

Additionally, the preset value establishing circuit 142 is formed so that the detection of the contact of the probe 112 with the block gauge 120 can establish the preset value displayed on the display unit 114.

In other words, as shown in FIG. 12, placed on the measuring table 116 is the block gauge 120 corresponding to the preset value displayed on the display unit 114, and the probe 112 is moved. The detection of the time when the top end of the probe 112 is brought into contact with the surface of the block gauge 120 by using any means, a contact pressure switch for example, establishes and registers in the preset memory 126 the preset value displayed on the display unit 114 as the new preset value representing the contact position of the top end of the probe 112.

As mentioned above, in the preset value establishing circuit 142 of this embodiment the touch operation of the preset switch 130 or the establishing touch operation of the switch exhibiting the preset function by the detection of the contact at the top end of the probe 112 can establish and register in the preset memory 126 the value displayed on the display unit 114 as the new preset value. When the preset value is completed its establishment and registration, the preset value displayed on the display unit 114 is automatically released, and a series of the preset value establishing operation is completed.

By the composition as is mentioned above, according to the apparatus of the present invention, the combined operation of the preset switch 130 in accordance with the predetermined time sequence illustrated in the flow chart of FIG. 8 or FIG. 10 for example can establish and register the requested numerical value as the preset value.

Therefore, according to the apparatus of the present invention, since the operating switches can be reduced to the minimum at the time of the preset value establishment, the apparatus in total can be designed with extreme simplicity and in very small sizes. Moreover, in the apparatus of the present invention, since the operating switch can be reduced to the minimum at the time of the preset value establishment, the operational capability of the switches can be increased and the misoperation of the switches can be effectively prevented.

The embodiment mentioned above shows an example that the preset value called and displayed on the display unit 114 is once converted into the other value, and established and registered as the new preset value. The apparatus of the present invention, however, is not limited to this operation. When the preset value called and displayed by the operation mentioned in the item of (1) is adequate to the object 110 to be measured. the preset value converting operation mentioned in the item of (2) can be skipped to perform the preset value establishing operation described under the item of (3).

Furthermore, in the embodiment mentioned above, the example is taken on the case that one preset value is established in the preset memory 126. The apparatus of the present invention, however, is not limited to this operation. A plurality of preset value can be established in the second, the third times so on by the movements of the probe 112 after the completion of the first preset value establishing operation.

In this case one of the preset values already established can be used as the highest or lowest limit measurement of the object.

Moreover, the apparatus of this embodiment is composed so that the preset values established and registered in the preset memory 126 cannot be cleared out when the power supply is topped or switched off.

As described heretofore, according to the present invention, since the preset values can be established by a series of combined operation in accordance with the predetermined time sequence of the preset switch, the preset value can be established by the extremely less numbers of the switch, and the apparatus in total can be designed with simplicity and in small sizes. Furthermore since the establishment of the preset values can be performed by the less numbers of the operational switch, the operational capability of the switch is increased and the misoperation of the switches can be effectively prevented.

The Third Embodiment

FIG. 13 is a block diagram showing the composition of the third preferred embodiment of the digital display measuring apparatus in accordance with the teachings of the present invention, and FIG. 4 is a schematic outer view of the apparatus of this embodiment.

In FIGS. 13 and 14, the digital display measuring apparatus 214 in accordance with the teachings of the present invention is fixed to the requested position of the base plate, not illustrated, according as the sizes of the object to be measured. The digital display measuring apparatus 214 is equipped with a probe 218 which is brought in contact with the object 216 to be measured, and moves to displace toward the axis direction. This displacing amount of the probe 218 is converter into the electric signal pulse by an encoder 220. This encoder 220 is composed of well-known encoder of photo-electric type, electrostatic capacity type or variable resister type.

The electric signal pulse supplied from tne encoder 220 mentioned above is counted by a counter 222, and this counted value is displayed at the display section in a digital display unit 210.

Accordingly, a read of this displayed value obtains the absolute amount or the comperative amount of the object 216 immediately.

The displayed value mentioned above shows the displacing amount of the effective stroke regions of the probe 218 in the digital display measuring apparatus 214, and the absolute measurement becomes impossible for the object 216 to be measured exceeding to this effective process. In the present invention, in order to solve such inconvenience, a presetting device is installed to the body of the apparatus and the absolute measurement of the object in large sizes can be simply obtained.

This invention is characterized in that the presetting device 224 is specificly composed to establish the measuring standard value in order to have the measuring apparatus to be designed in small sizes and to be operated and handled with ease.

In this embodiment the presetting device 224 has a preset switch 225 which inputs the numerical value into the lower digit of the displayed digits on the digital display unit 210 and a shifting circuit 226 which shifts the input value up to the requested higher digit of the displayed digits.

The preset switch 225 mentioned above inputs the numerical value of the requested digit in tne measuring standard value to the lower digit diviced into requested numbers of the digital display unit 210.

Furthermore, the numerical value input in such a way is shifted up to the requested position of the higher digit by the shifting action of the shifting circuit 226. In other words, the shifting circuit 226 has a single shifting push-button switch 228 to be connected and the push-button operation of this switch 228 activates the shifting circuit 226 as is mentioned above.

Accordingly, in the higher digit of the measuring standard value, the repeated operations of the inputting and shifting up numerical value as mentioned above can also display an adequate value as the preset value in the display section of the display unit 210.

In this embodiment, this preset value is memorized in the preset memory 229 and can be read out at any time.

Therefore, the troublesome action of presetting this value at every measurement can be easily deleted. It is also possible that the preset value is output as signal from the preset memory 229 to the counter 222 and the displacing amount of the 218 is added to or subtracted from the counted value therein.

In this embodiment furthermore, as previously described, the simple shifting push-button switch 228 provides a shifting command to the shifting circuit 226, and this simple push-button operation shifts up the input value from the preset memory 229 to the requested digit position.

As described hereinabove, this embodiment is composed of the operation by the single push-button switch 228, and the simplified preset operation effectively prevents from the misoperation of the apparatus.

The display section of the digital display unit 210 in this embodiment is divided into every requested digit. For example, the display section shown in FIG. 15 is formed to be divided into the lower digit display portion 230a and the higher digit display portion 230b, each of which consists of three display digits. The display section shown in FIG. 16 is formed to be respectively divided into individual one digit so that the shifting-up operation of the input preset value to the higher digit is performed by means of shifting the value input to the lower digit up to the higher digit at every unit of the divided digit. For example, in the apparatus shown in FIG. 15, in order to preset the value of "123.456" the first pushing action of the shifting push-button switch 228 displays the nun'erals of "000.000" on the display section of the digital display unit 210 (FIG. 15 (a)). In this case, "000" up from the decimal point shows the numerical value of the higher digit display portion 230b, and "000" down from the decimal point shows the numerical value of the lower digit display portion 230a.

Next, the input of the higher digit display of the preset value "123" shows the numerals of "000.123" on the display section of the digital display unit 210 (FIG. 15 (b)), The pushing action of the shifting push-button switch 228 shifts the above mentioned displayed value up to the higher digit display portion 230b in the lump and the display unit 210 displays "123.000" (FIG. 15 (c)).

The input of the numerical value of the lower three digits of the preset value to the lower digit display portion 230a establishes the objective preset value "123.456" to be displayed in the display section (FIG. 15 (d)).

In FIG. 16 shown therein is an example of establishing the requested preset value in such a case that the display section of the digital display unit 210 is formed to be divided into the individual one digit. In this composition, the numerical value of the highest digit of the preset value is counted and input to the lowest display digit (FIG. 16 (a)), and this numerical value is shifted up by one digit by the operation of the shifting push-button switch 228 (FIG. 16 (b)). The repetition of the inputting and shifting-up operations can establish the requested preset value of FIG. 16 (f).

As mentioned above, according to this embodiment, the preset modes can be selected and designed adequately in accordance with the objectives of the useage.

According to this embodiment, therefore, the effective useage of the presetting device enables the absolute measurement of the large sized object exceeding to the effective process region of the probe 218 with extreme ease.

For example, contrasting the embodiments of FIGS. 1 and 2 with that of FIG. 3, in the embodiments of FIGS. 1 and 2 a preset value is prepared by protecting the displacement of the probe 218 and displaying it. When a preset value is required, the probe 218 is moved upwardly by the operator to change the display value of the digital display unit 210. As the value of the display reaches the desired preset value, the preset switch 225 is pushed to set the display value as the preset value. Therefore, the maximum preset value is limited to be the maximum displacement of the probe 218 which means that preset values greater than the maximum probe displacement cannot be set. In contrast thereto, in the third embodiment the display is divided into lower order display portions 230a and higher order display portions 230b and the preset value is created by a plurality of presetting procedures. First, a preset value is set in the lower order display portion 230a by displacing the probe 218. Next, the preset value displayed in the lower order display portion 230a is shifted to the higher order display portion 230b by the operation of the shifting switcn 228. Next, the empty lower order display 230a is filled with another value detected by displacing the probe 218. Accordingly, a larger preset value than the maximum of the displacement of the probe 218 can be set in the preset memory 229.

As described heretofore, according to the present invention, the composition that the establishment of the preset value is performed by the shifting action of the shifting circuit enables the measuring appratus to be designed in small size and light weight, to be operated and handled with extreme ease and convenience, and to be effectively prevented from misoperation.

What is claimed is:

1. A digital display measuring apparatus including:
a probe which is movably installed to the body and brought in contact with the object to be measured;
an encoder which converts a displacing amount of said probe into electric signal pulse to output therefrom;
a presetting device which establishes as a preset value the measuring standard value in accordance with the object to be measured;
a counter which counts said preset value and said electric signal pulse; and
a digital display unit which displays in digital representation the measured value of the object in accordance with the counted value;
wherein said presetting device comprises:
a preset switch which is operated for the establishment of preset value, said preset switch comprises:
a preset value display circuit which calls to display the preset value in the preset memory on the digital display unit by the call touch operation of said preset switch;
a cursor display circuit which displays a cursor at any display digit of said digital display unit and moves the cursor display digit one after another by means of the continuous touch operation of the present switch for a certain time for the movement of the cursor;
a convertor which advances and converts the cursor display digit of the displayed preset value on the digital display unit by means of the advance touch operation of the preset switch; and
an establishing circuit which establishes as the new preset value the preset value after the conversion by means of the establishing touch operation of the preset switch after the completion of a series of conveting operation of the preset value displayed on the digital display unit; and
a preset memory in which an optional numerical value displayed on the digital display unit is established as the preset value by the operation of said preset switch;
whereby the preset value corresponding to the object to be measured can be established by a series of combined operation in accordance with the predetermined time sequence of the preset switch.

2. A digital display measuring apparatus including:
a probe which is movably installed to the body and brought in contact with the object to be measured;
an encoder which converts a displacing amount of said probe into electric signal pulse to output therefrom;
a presetting device which establishes as a preset value the measuring standard value in accordance with the object to be measured;
a counter which counts said preset value and said electric signal pulse; and
a digital display unit which displays in digital representation the measured value of the object in accordance with the counted value;
wherein said presetting device comprises:
a preset switch which is operated to establish a preset value;
a shifting switch;
a shifting circuit for individually shifting a plurality of lower order digits displayed on said digital display one by one to higher order positions on said digital display by operating said shifting switch until said optional numerical value is displayed on said digital display; and
a preset memory in which said optional numerical value displayed on the digital display unit is memorized by operation of said preset switch and said shifting switch;
whereby a preset value larger than a maximum probe displacement can be set in said preset memory.

3. A digital display measuring apparatus according to claim 2, wherein the display section of the digital display unit is divided into a lower digit display portion and a higher digit display portion, each one of which consists of an equal plurality of display digit, and said shifting circuit shifts up in the lump the numerical value input to the lower display digits by the operation of the preset switch.

4. A digital display measuring apparatus according to claim 2, wherein the numerical value input to the lower digit of the digital display unit by the operation of the preset switch is shifted up by one digit by one digit to the higher digit by said shifting circuit.

5. A digital display mesuring apparatus according to claim 2, wherein said shifting circuit is equipped with a single shifting push-button switch, and the push-button operation of said switch performs the digit shifting-up action of the preset input value.

* * * * *